No. 689,353.  
Patented Dec. 17, 1901.
R. V. CHEATHAM.
PROTECTIVE MECHANISM FOR SYSTEMS OF ELECTRICAL DISTRIBUTION.
(Application filed May 23, 1901.)
(No Model.)
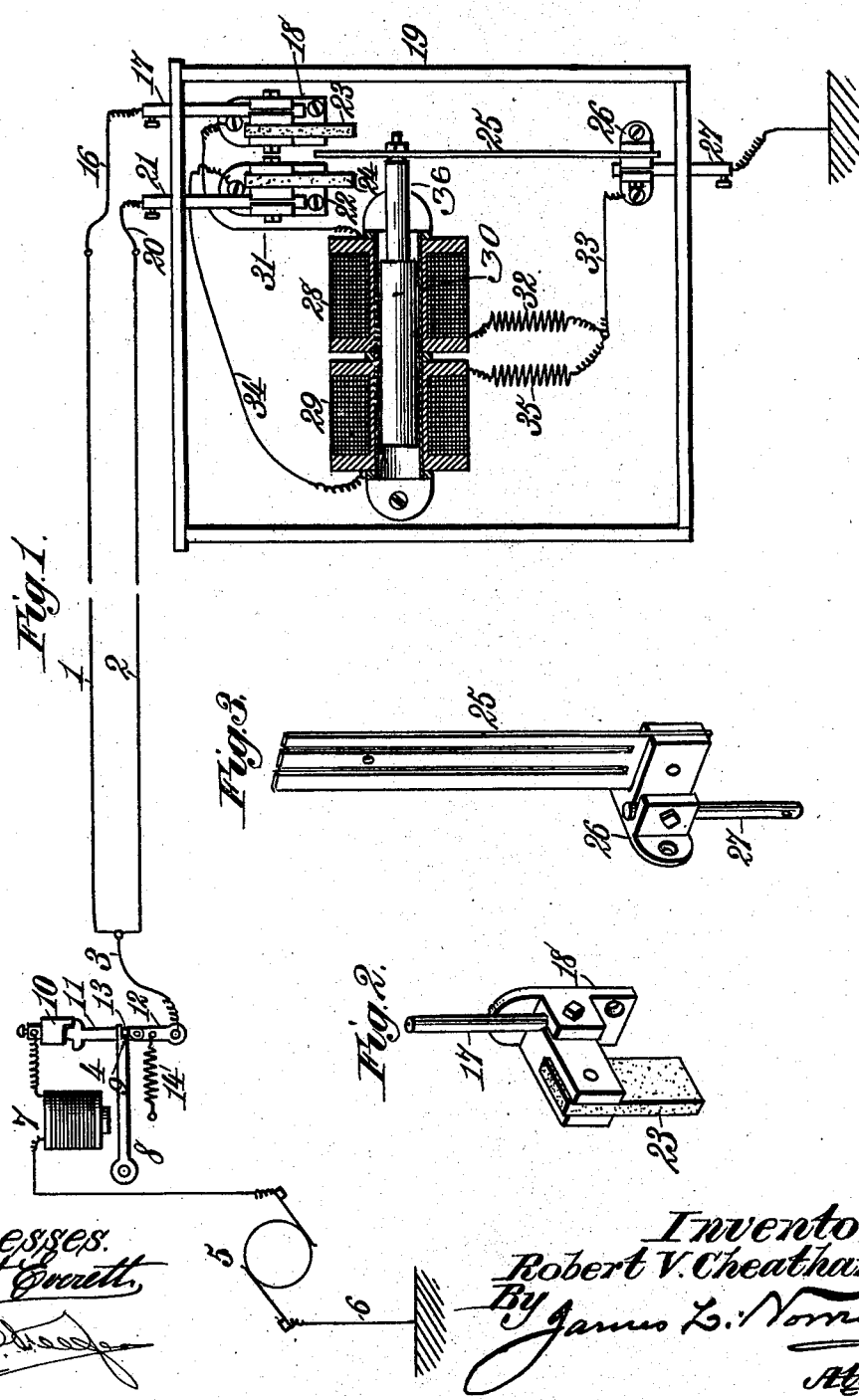
Witnesses.
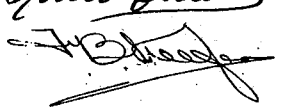
Inventor.
Robert V. Cheatham.
By 
Atty.

UNITED STATES PATENT OFFICE.

ROBERT V. CHEATHAM, OF LOUISVILLE, KENTUCKY, ASSIGNOR OF ONE-HALF TO JOSEPH A. STEWART, OF LOUISVILLE, KENTUCKY.

PROTECTIVE MECHANISM FOR SYSTEMS OF ELECTRICAL DISTRIBUTION.

SPECIFICATION forming part of Letters Patent No. 689,353, dated December 17, 1901.

Application filed May 23, 1901. Serial No. 61,610. (No model.)

*To all whom it may concern:*

Be it known that I, ROBERT V. CHEATHAM, a citizen of the United States, residing at Louisville, in the county of Jefferson and State of Kentucky, have invented new and useful Improvements in Protective Mechanism for Systems of Electrical Distribution, of which the following is a specification.

My invention relates to protective mechanism for high-tension systems of electrical distribution, the same being designed particularly for use in connection with electric-railway distribution systems.

The primary object of the invention is to provide novel means for preventing injury or loss of life in the event of a breakage of an overhead conductor carrying a high-tension current.

The invention consists of means thrown into operation by a breakage of one of the conductors of the system for grounding the other conductor, and thereby throwing into operation a circuit-breaker and automatically cutting off the flow of current to the system.

The invention also consists in certain features and details of construction and combinations of parts, which will be hereinafter more fully described and claimed.

In the drawings forming part of this specification, Figure 1 is a diagrammatic view illustrative of my invention, showing some of the parts thereof in sectional elevation. Figs. 2 and 3 are perspective views of details of construction.

Like reference-numerals indicate like parts in the different views.

My invention has been shown in connection with the trolley-wires 1 and 2 of an electric-railway system, with which it is especially adapted for use. Said wires are supplied with current through a common feeder 3 and a circuit-breaker 4 from a generator 5 of any suitable form and construction. One pole of the generator 5 is grounded through the wire 6, as is customary, and the circuit-breaker 4 is adapted to be thrown into operation to cut off the conductors 1 and 2 from the generator 5 when there is an excessive flow of current through the system. Any suitable form of circuit-breaker may be employed; but I have illustrated in the drawings one which is adapted for my purpose. The same includes an electromagnet 7 and a pivoted armature 8 therefor, constituting a trigger and having a shoulder 9 adjacent to its free end. Connected with the coil of the magnet 7 is a block 10, of brass, copper, or other suitable conducting material, in engagement with which there is normally held a contact device made up of the sections 11 and 12, pivoted to each other, as shown. The section 12 is provided with a lug or projection 13 thereon, adapted to be engaged by the shoulder 9 on the armature 8, and also has connected to it a spring 14, normally acting to move the section 12 laterally on its pivot 15. The normal position of the parts is as shown in the drawings when the circuit is closed from the generator 5 to the trolley-wires 1 and 2, through the magnet 7, the block 10 of conducting material, the sections 11 and 12 of the contact device, and the wire 3. Now in the event of an excessive flow of current through either one of the wires 1 and 2 the magnet 7 will be abnormally energized and will serve to attract its armature 8 in an obvious manner. When this takes place, the shoulder 9 on said armature is released from its engagement with the lug 13 on the section 12 of the contact device and the spring 14 is then free to act to turn the section 12 on its pivot 15 and separate the section 11 from the block 10. The main circuit from the generator to the trolley-wires 1 and 2 is thereby broken between the block 10 and the section 11.

The circuit-breaker 4, above specifically described, is one which is suitable for my purpose; but the same forms no part of my invention and I make no claim to it herein.

Instead of connecting the wires or conductors 1 and 2 at the end of the system opposite the generator 5 the same are separated or insulated from each other. Leading from the wire 1, at or near the end thereof, is a wire 16, which is connected through the rod 17 to a clamp 18, secured to and located within a box or casing 19. The said box or casing may be supported at any convenient point, preferably upon one of the trolley-poles. Leading from the trolley-wire or conductor 2 is a wire 20, which is connected through a rod 21 to a metallic clamp 22, also secured to and located within the box or casing 19. The clamps 18 and 22 are insulated from each other and have secured to them blocks 23 and 24, respectively, of carbon or other suitable material. The said blocks 23 and 24 are separated from each other and constitute the terminals of the trolley-wires or conductors 1 and 2. Located between the terminals 23 and 24 is a stiff spring plate or rod 25, secured at its lower end to a bracket or clamp 26 in the box 19, which bracket or clamp is grounded through the rod or conductor 27. The spring plate or rod 25, the bracket or clamp 26, and the rod or conductor 27 constitute a ground of low resistance.

In connection with the foregoing parts I employ two electromagnets 28 and 29, the same being shown in the form of solenoids set end to end within the box or casing 19 and having a common core or armature 30. The solenoid 28 is connected with the clamp 18 through a small wire 31 and to ground through resistance-coil 32, wire 33, clamp or bracket 26, and conductor 27. The solenoid 29 is connected with the clamp 22 through a small wire 34 and to ground through the resistance-coil 35, wire 33, bracket or clamp 26, and conductor 27. The spring plate or rod 25 is connected to the core 30 of the solenoids 28 and 29 by means of a brass bar or core extension 36. The solenoids 28 and 29 are so wound that when both are energized the core 30 thereof will be maintained at a central or intermediate position between the two. When in this position, the spring plate or rod 25 lies at a point intermediate the circuit-terminals 23 and 24. When both of the trolley-wires or conductors 1 and 2 are intact, two circuits of high resistance will be closed to ground through the solenoids 28 and 29, respectively, over the following paths: from wire 1, through wire 16 and rod 17, to clamp 18, thence through wire 31, solenoid 28, resistance-coil 32, wire 33, bracket 26, and conductor 27 to ground, and from wire 2, through wire 20 and rod 21, to clamp 22, thence through wire 34, solenoid 29, resistance-coil 35, wire 33, bracket 26, and conductor 27 to ground. Both the solenoids 28 and 29 are therefore normally energized, the core 30 is normally maintained at a central position with respect to said solenoids, and the spring plate or rod 25 is normally maintained at a point between the contact-terminals 23 and 24. Let it be assumed that from one cause or another the trolley-wire or conductor 2 becomes broken. In such case the circuit above traced through the solenoid 29 will also be broken. The core 30 is then acted upon by the solenoid 28 alone, with the result that said core is moved outwardly or to the right, carrying with it the spring rod or plate 25 and moving it into contact with the circuit-terminal 23. A ground of low resistance is thereby thrown into operation from the trolley-wire 1 through the wire 16, rod 17, clamp 18, carbon block 23, spring plate or rod 25, bracket 26, and conductor 27. An excessive flow of current from the generator 5 over the conductor 1 is thereby caused, which instantly throws into operation the circuit-breaker 4, causing the entire system to be immediately cut off from said generator. The circuit-breaker 4 will be thrown into operation for the purpose described before the broken ends of the wire or conductor can fall to the ground and danger of accident due to contact with one or the other of said broken ends is effectually avoided. In the event that the trolley-wire or conductor 1 should become broken from any cause the circuit through the solenoid 28 is also broken and the core 30 is acted upon by the solenoid 29 alone, with the result that the spring plate or rod 25 is moved to the left into contact with the circuit-terminal 24 and a ground of low resistance from the wire 2 is closed through the wire 20, rod 21, clamp 22, carbon block 24, spring plate or rod 25, bracket 26, and conductor 27. The circuit-breaker 4 is thereby thrown into operation in the same manner and with the same result as before. It will thus be seen that by my improved mechanism a break in either one of the trolley-wires or conductors will cause a ground of low resistance to be cut in from the other of said wires or conductors and instantly operate the circuit-breaker to cut off the entire system from the generator or source of supply.

I have described the generator 5 as being located at one end of the circuit and the automatic grounding mechanism at the other. It is obvious, however, that when the wires or conductors 1 and 2 are supplied with current from a station intermediate their ends an automatic grounding device similar to that above described will be located at each end of the circuit.

Having now described my invention, what I claim as new, and desire to secure by Letters Patent, is—

1. In a system of electrical distribution, a plurality of line conductors, a circuit-breaker for cutting out the line, a low-resistance ground, and means thrown into operation by a breakage of one of said conductors for cutting in said ground on the other and thereby throwing said circuit-breaker into operation.

2. In a system of electrical distribution, a plurality of line conductors, a circuit-breaker for cutting out the line, controlling means for said circuit-breaker, a low-resistance ground, and electromagnetic means automatically thrown into operation by a breakage of one of said conductors for cutting in said ground on the other to actuate said controlling means and thereby operate said circuit-breaker and cut out the line.

3. In a system of electrical distribution, the combination with a generator having one side thereof grounded, a plurality of line conductors connected with the other side of said generator, and a circuit-breaker interposed between said generator and said conductors, of means automatically thrown into operation by a breakage of one of the line conductors for grounding the other of said conductors and thereby actuating said circuit-breaker and cutting out the line.

4. In a system of electrical distribution, the combination with a generator having one side thereof grounded, a plurality of line conductors connected with the other side of said generator, and a circuit-breaker interposed between said generator and said conductors, of a conducting part connected to ground, movable between the circuit-terminals of said conductors, and means automatically thrown into operation by a breakage of one of said conductors for moving said conducting part into contact with the circuit-terminal of the other conductor, thereby grounding the latter conductor, actuating said circuit-breaker and cutting out the line.

5. In a system of electrical distribution, the combination with a generator having one side thereof grounded, a plurality of line conductors connected with the other side of said generator, and a circuit-breaker interposed between said generator and said conductors, of a conducting part connected to ground, movable between the circuit-terminals of said conductors, and electromagnetic means automatically thrown into operation by a breakage of one of said conductors for moving said conducting part into contact with the circuit-terminal of the other of said conductors, thereby grounding the latter conductor, actuating said circuit-breaker and cutting out the line.

6. In a system of electrical distribution, the combination with a generator having one side thereof grounded, a plurality of line conductors connected with the other side of said generator, and a circuit-breaker interposed between said generator and said conductors, of a conducting part connected to ground, movable between the circuit-terminals of said conductors, a plurality of electromagnets connected respectively with said conductors, and a common armature therefor normally acted upon by both of said magnets and connected with said conducting part for normally maintaining the latter at a point between said circuit-terminals, whereby when one of said magnets is deënergized by a breakage of one of said conductors the other of the same will act upon said armature for moving said conducting part into contact with the circuit-terminal of the unbroken conductor, thereby grounding the same, actuating said circuit-breaker and cutting out the line.

7. In a system of electrical distribution, the combination with a generator having one side thereof grounded, a plurality of line conductors connected with the other side of said generator, and a circuit-breaker interposed between said generator and said conductors, of a conducting part connected to ground, movable between the circuit-terminals of said conductors, a plurality of solenoids in line with each other, connected respectively to said conductors and to ground through resistance, and a common core for said solenoids connected with said conducting part for normally holding the same at a point between said circuit-terminals, whereby upon a breakage of one of said conductors said conducting part will be moved into contact with the circuit-terminal of the other of said conductors, thereby grounding the same, actuating said circuit-breaker and cutting out the line.

8. In a system of electrical distribution, the combination with a generator having one side thereof grounded, a plurality of line conductors connected with the other side of said generator, and a circuit-breaker interposed between said generator and said conductors, of a box or casing, a pair of clamps therein insulated from each other and connected respectively with said conductors, circuit-terminals secured to said clamps and separated from each other, a bracket secured in said box, a grounded conductor connected therewith, a spring conducting plate or rod secured to said bracket and having its free movable end located between said circuit-terminals, a pair of solenoids in said box in line with each other, circuit connections between said clamps and said solenoids respectively, connections between said solenoids and said bracket, resistance-coils in the latter connections, and a common core for said solenoids connected with said spring plate or rod, as and for the purpose set forth.

In testimony whereof I have hereunto set my hand in presence of two subscribing witnesses.

ROBERT V. CHEATHAM.

Witnesses:
S. S. GAMIS,
HUGH L. ROSE.